(12) United States Patent
Heidan et al.

(10) Patent No.: US 9,914,345 B2
(45) Date of Patent: Mar. 13, 2018

(54) WIND PROTECTION DEVICE ON A CLOSABLE ROOF OPENING PORTION OF A MOTOR VEHICLE

(71) Applicants: Michael Heidan, Stuttgart (DE); Marc Wendler, Ostfildern (DE)

(72) Inventors: Michael Heidan, Stuttgart (DE); Marc Wendler, Ostfildern (DE)

(73) Assignee: BOS GMBH & CO. KG, Ostfildern (DE)

( * ) Notice: Subject to any disclaimer, the term of this patent is extended or adjusted under 35 U.S.C. 154(b) by 0 days.

(21) Appl. No.: 15/270,295

(22) Filed: Sep. 20, 2016

(65) Prior Publication Data

US 2017/0080787 A1    Mar. 23, 2017

(30) Foreign Application Priority Data

Sep. 22, 2015   (DE) .................. 10 2015 218 200

(51) Int. Cl.
*B60J 7/22* (2006.01)
*B60J 1/20* (2006.01)

(52) U.S. Cl.
CPC .. *B60J 7/22* (2013.01); *B60J 1/20* (2013.01)

(58) Field of Classification Search
CPC ........................................................ B60J 7/22
USPC ........................................................ 296/217
See application file for complete search history.

(56) References Cited

U.S. PATENT DOCUMENTS

| | | |
|---|---|---|
| 8,590,963 B2 | 11/2013 | Nowack et al. |
| 9,033,409 B2 | 5/2015 | Eberst et al. |
| 2013/0187414 A1 | 7/2013 | Nowack et al. |
| 2014/0252809 A1 | 9/2014 | Eberst et al. |

FOREIGN PATENT DOCUMENTS

| | | |
|---|---|---|
| DE | 10 2011 103 980 A1 | 12/2012 |
| DE | 20 2013 103 807 U1 | 10/2013 |
| DE | 10 2013 203 979 A1 | 9/2014 |

OTHER PUBLICATIONS

Search Report of European Patent Office issued in Application No. 16 18 4910 with English translation of category of cited documents dated Feb. 24, 2017 (6 pages).

*Primary Examiner* — Dennis H Pedder
(74) *Attorney, Agent, or Firm* — Flynn, Thiel, Boutell & Tanis, P.C.

(57) ABSTRACT

A wind protection device having a curved wind deflection member on which a flexible wind protection structure is retained and which has at least one lateral wind deflection arm which can be displaced by means of a guiding mechanism in the vertical direction and in the longitudinal direction of the openable roof portion between a lower rest position and an upwardly deployed operating position. The guiding mechanism includes a linear force guide having a curved guiding path along which the wind deflection arm can be displaced in the longitudinal and vertical direction relative to the roof opening portion. The wind deflection arm is associated with at least one additional supporting surface which is supported on a stationary sliding surface extending in parallel to the guiding path.

20 Claims, 3 Drawing Sheets

WIND PROTECTION DEVICE ON A CLOSABLE ROOF OPENING PORTION OF A MOTOR VEHICLE

CROSS-REFERENCE TO RELATED APPLICATIONS

This claims priority from German Patent Application No. 10 2015 218 200.2, filed on Sep. 22, 2015, the disclosure of which is hereby incorporated by reference in its entirety into this application.

FIELD OF THE INVENTION

The invention relates to a wind protection device on a closable roof opening portion of a motor vehicle, having a curved wind deflection member on which a flexible wind protection structure is retained and which has at least one lateral wind deflection arm which can be displaced by means of a guiding mechanism in the vertical direction and in the longitudinal direction of the openable roof portion between a lower rest position and an upwardly deployed operating position, wherein the guiding mechanism includes a linear force guide having a curved guiding path along which the wind deflection arm can be displaced in the longitudinal and vertical direction relative to the roof portion.

BACKGROUND OF THE INVENTION

Such a wind protection device is known from DE 10 2013 203 979 A1. The known wind protection device is arranged on the front side of a roof portion of a passenger vehicle closable by a movable roof cover. The wind protection device has a curved wind deflection member on which a flexible wind protection structure is held. The curved wind deflection member extends in the transverse direction of the vehicle over the width of the openable roof portion and is provided with two lateral wind deflection arms on opposite sides thereof, which arms are integral to the curved wind deflection member. Each wind deflection arm is mounted to be movable relative to the roof portion both in the longitudinal direction of the roof portion and in the vertical direction by means of a respective guiding mechanism. The guiding mechanism includes a circular arc-shaped slotted guide for each wind deflection arm, and a sliding block curved in the manner of a circular arc is displaceable therein, which sliding block is integrally connected to the respective wind deflection arm. For transferring the curved wind deflection member to a raised operating position, each wind deflection arm is associated with a helical spring, which spring exerts forces and momentums on the curved wind deflection member to allow an automatic transfer of the curved wind deflection member to the operating position. The curved wind deflection member is mounted and supported on the roof side merely by the two wind deflection arms.

SUMMARY OF THE INVENTION

An object of the invention is to provide a wind protection device of the type mentioned in the introduction which ensures increased stability during practical employment on a roof portion of an automotive vehicle.

This object is achieved in that the wind deflection arm is associated with at least one additional supporting surface which is supported on a stationary sliding surface extending in parallel to the guiding path. The supporting surface and the sliding surface are oriented complementary to each other in such a manner that forces acting on the wind deflection arm from above meet additional support. This is to ensure that the curved wind deflection member in its deployed operating position has improved stabilization against forces acting on the curved wind deflection member from above. The solution according to the invention is particularly advantageous for employment on a front side of a roof opening portion of a vehicle roof of a passenger vehicle. The roof opening portion is closed by a roof cover which is movable between a closed position and an open position lengthwise of the roof opening portion. The roof cover can be a sliding roof or a sliding/elevating roof. The curved wind deflection member is to spread a flexible wind protection structure which preferably is in the form of a type of net. The curved wind deflection member is associated with at least one spring unit to apply force and torque to the curved wind deflection member in the direction of the raised operating position. Preferably, the curved wind deflection member is supported by two lateral wind deflection arms, and each thereof is associated with a distinct spring unit. Advantageously, each wind deflection arm is displaceable by means of a guiding mechanism, wherein the wind deflection arms and the respective guiding mechanism are mirror-symmetrical, but otherwise constructed in an identical manner. Also, the curved guiding paths arranged on the opposite sides of the roof opening portion are identical to each other and mirror-symmetrical with respect to a vertical longitudinal center plane of the vehicle. Also, the wind deflection arms and the two guiding mechanisms are mirror-symmetrical to each other and relative to the same plane.

In an embodiment of the invention, the guiding path is a circular arc-shaped slotted guide, and the guiding mechanism includes a sliding block curved in the manner of a circular arc, which block is rigidly connected to the wind deflection arm and mounted in the slotted guide to be slidingly movable. Preferably, the sliding block is integrally molded to the wind deflection arm.

In a further embodiment of the invention, the slotted guide is integrated in a functional component of a guiding arrangement for a movable roof cover, which component is stationary in relation to the roof opening portion, in a ready-for-use installed condition. The functional component is preferably part of a guide rail system for the movable roof cover.

In a further embodiment of the invention, the functional component is in a web-type shape oriented in the vertical direction, and the functional component has at least one upper end edge surface which is the sliding surface for the wind deflection arm. The functional component can be an integral part of a corresponding guide rail system, or can be a separately manufactured component, which is fixedly connected to the corresponding guide rail system or to a frame module of the closable roof opening portion. There may be one single or a plurality of end edge surfaces provided per functional component, i.e., per longitudinal side of the roof opening portion. As a result, an upper side of the functional component is a support surface, i.e. a sliding surface, for the wind deflection arm.

In a further embodiment of the invention, the end edge surface is oriented coplanarly or in parallel offset to a plane, where the slotted guide extends. Thus, the end edge surface is disposed either directly above the circular arc-shaped slotted guide, or else in the transverse direction of the roof inwards or outwards offset in relation to the slotted guide.

Advantageously, the functional component is embodied in one part or a plurality of parts. A multi-part embodiment is preferably in that at least one end edge surface extends in parallel offset in relation to the plane of the slotted guide. The "plane of the slotted guide" is meant to designate a planar orientation, which runs in the vertical direction and in the longitudinal direction, and in which the circular arc-shaped slotted guide is extended.

In a further embodiment of the invention, the functional component has a central web, wherein the slotted guide is provided, and two lateral parts flanking the central web, with at least one lateral part thereof being provided with the sliding surface for the wind deflection arm extending in parallel to the slotted guide. In said embodiment, the respective lateral part on each side of the roof opening portion for the respective wind deflection arm produces the desired supporting effect. Both the central web and also the lateral parts can be provided with corresponding upper end edge surfaces.

Further advantages and features of the invention will become apparent from the claims and from the description below of a preferred exemplary embodiment of the invention, illustrated with reference to the drawings.

DETAILED DESCRIPTION

Figure 1:
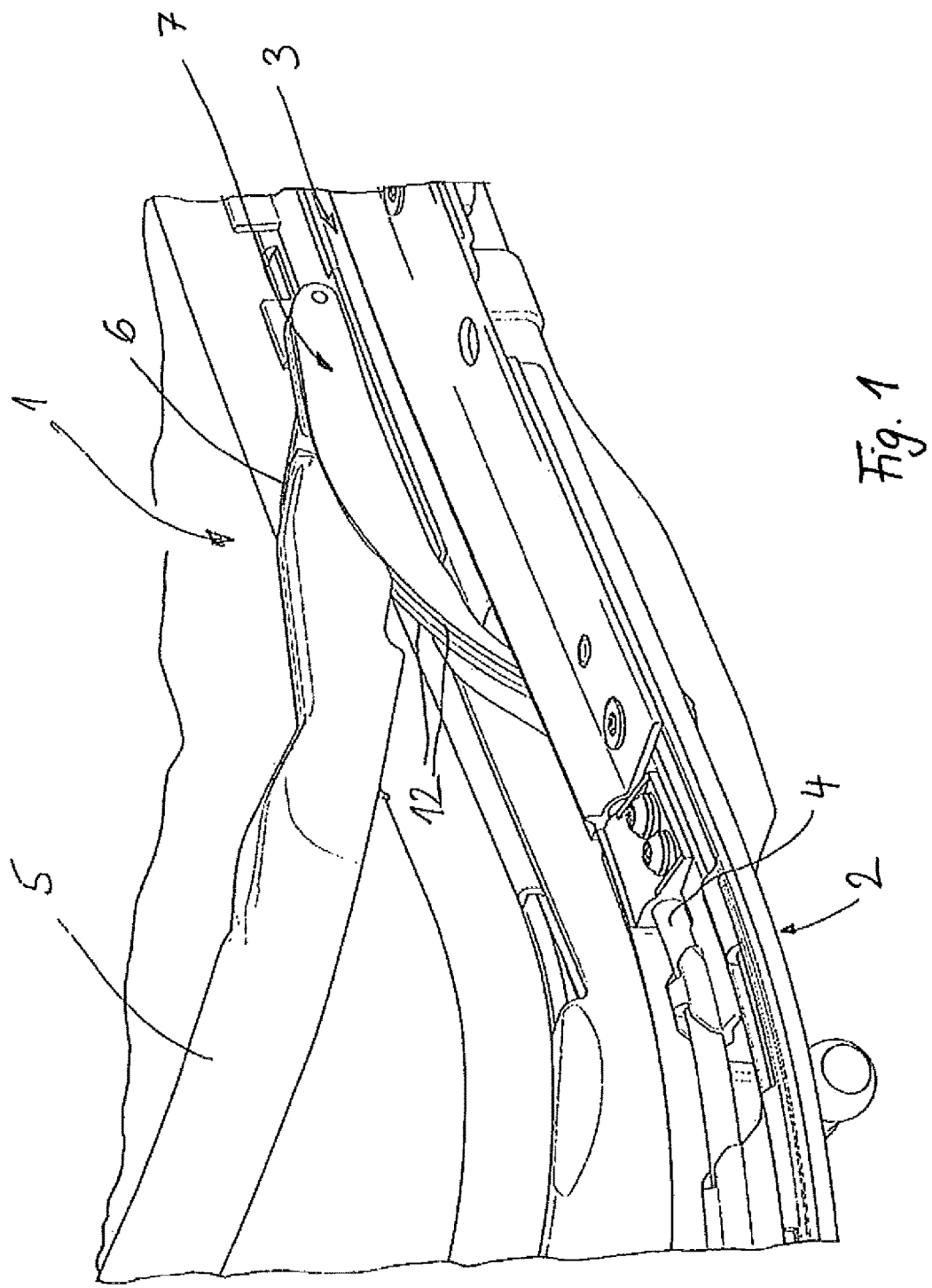
FIG. 1 shows a perspective view of a section of an embodiment of a wind protection device according to the invention.
Figure 2:
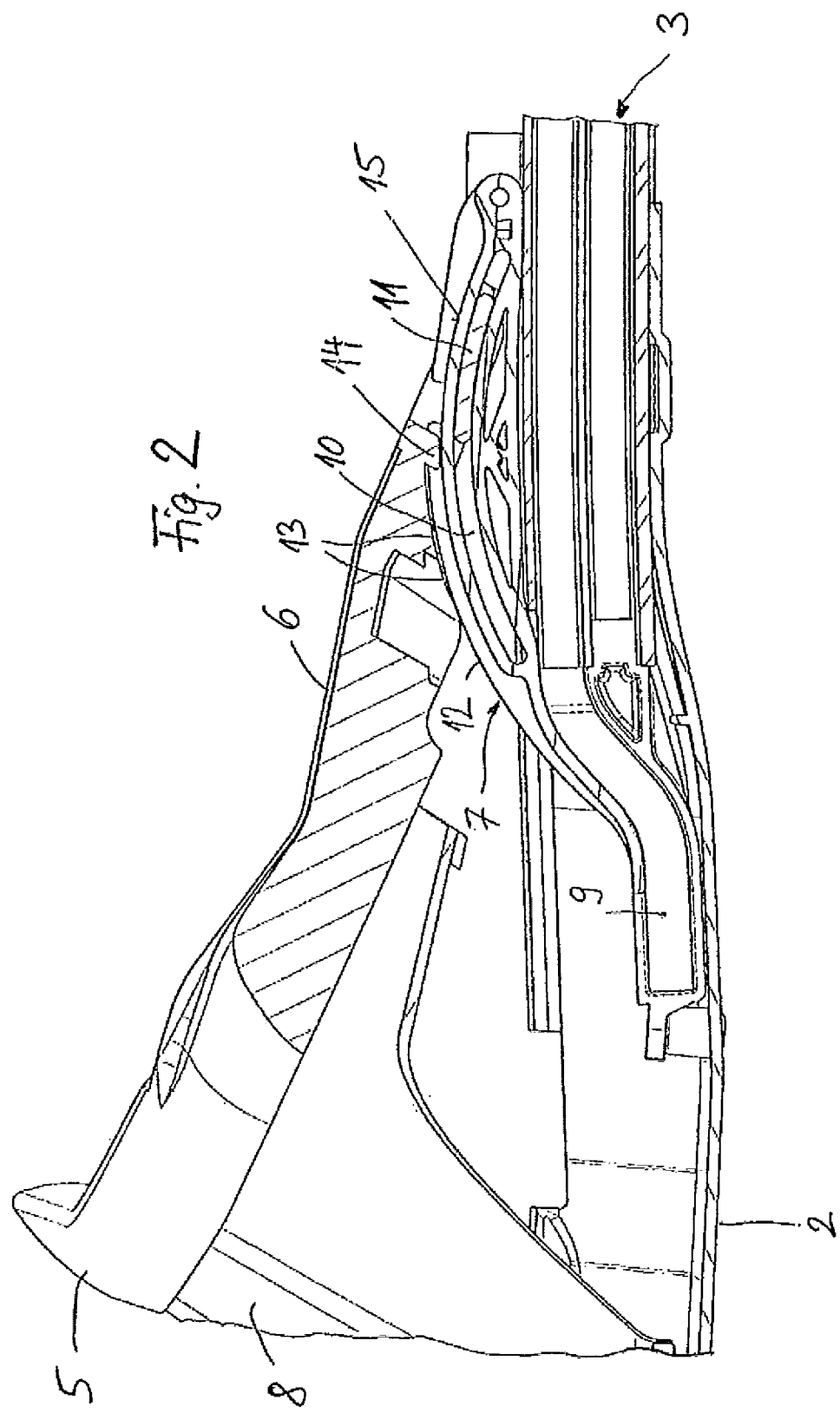
FIG. 2 shows a sectional view of the wind protection device according to FIG. 1 along a vertical sectional plane extending along the longitudinal direction of the roof.
Figure 3:
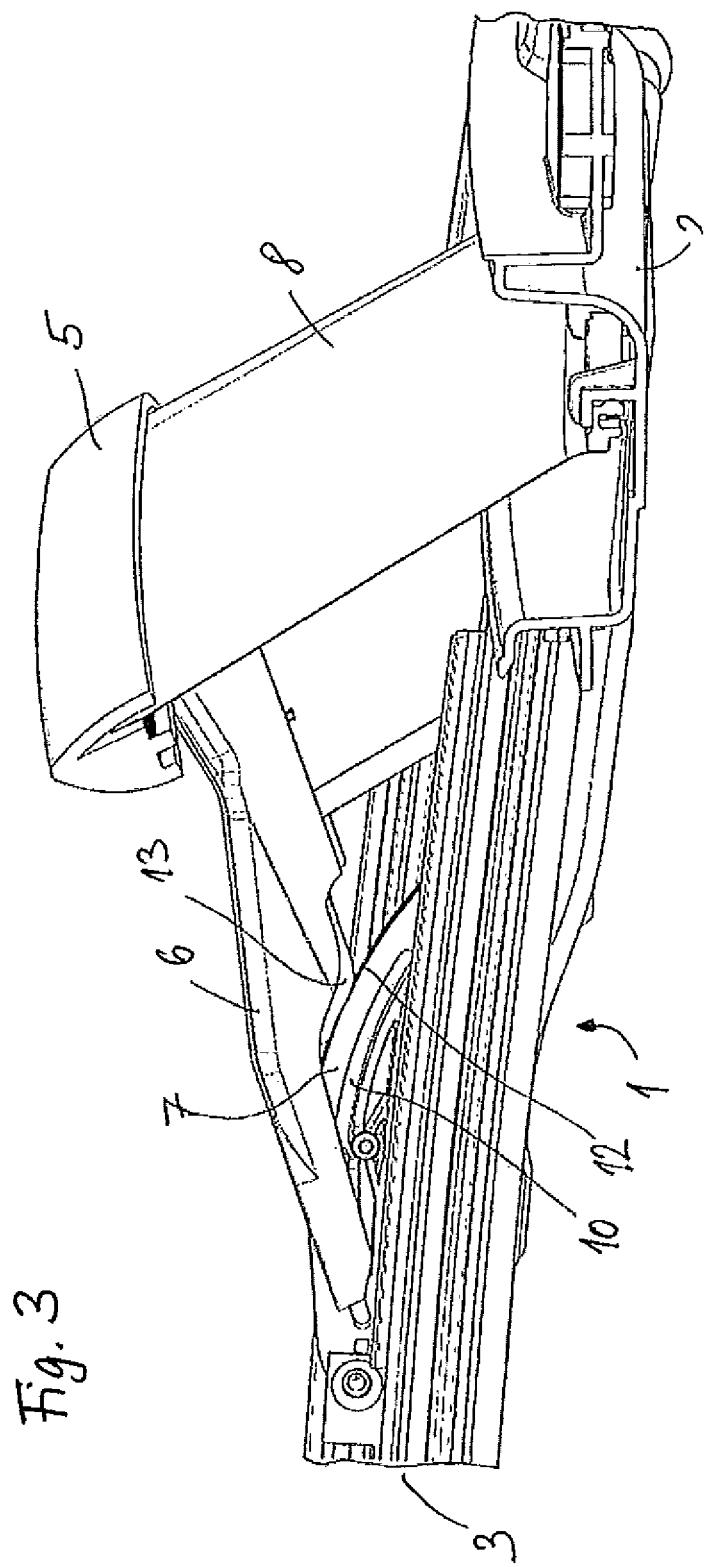
FIG. 3 shows another perspective view of a section of the wind protection device according to FIGS. 1 and 2, as seen from the center of a roof towards the exterior.

A wind protection device according to FIGS. 1 to 3 is intended for a vehicle roof of a passenger vehicle. The wind protection device is assigned to a roof opening portion 1 which is closable by means of a roof cover (not illustrated). The roof cover is part of a sliding roof system including a frame module 2 as a supporting frame. The frame module 2 is fixedly connected to corresponding edge regions of the roof opening portion 1 of the vehicle roof in the ready-for-use installed condition.

The wind protection device is disposed on a front end edge region of the roof opening portion 1, as seen in the ordinary direction of motion. The roof opening portion 1 is provided on each of opposite sides with a respective guiding arrangement 3 implemented in a guide rail system. The two guiding arrangements 3 on opposite sides of the roof opening portion 1 are configured to guide a respective guiding mechanism for the roof cover, in order to displace the roof cover lengthwise of the roof opening portion 1 in the longitudinal direction of the vehicle between a closed position and at least one open position. For displacement of the guiding mechanism a drive system is provided and comprises for each side a drive transmission means 4 in the form of a flexshaft engaging on a corresponding drive carriage of the respective guiding mechanism. The flexshaft is a flexible thread shaft which constitutes a drive cable rotating and longitudinally displacing during operation.

In order to prevent excessive wind noises or awkward airflow phenomena in the vehicle interior when the roof opening portion 1 is open, the wind protection device according to FIGS. 1 to 3 is provided. The wind protection device includes a curved wind deflection member 5 which extends over a width of the roof opening portion 1 in the transverse direction of the roof and transitions integrally into a respective wind deflection arm 6 on opposite sides thereof. An upper edge region of a flexible wind protection structure 8 is held in the curved wind deflection member 5, and the lower edge region thereof is fixed to the frame module 2. The curved wind deflection member 5 is displaceable in the longitudinal direction and in the vertical direction of the vehicle roof between a rest position (not illustrated) and a raised operating position (cf. FIGS. 1 to 3). In the raised operating position, the wind protection structure 8 is tightly spread. In a downwards lowered rest position of the curved wind deflection member 5, the curved wind deflection member 5 is positioned below the roof cover located in its closed position.

Each of the two wind deflection arms 6 is displaceable in the longitudinal direction of the roof within a circular arc-shaped slotted guide 10. Owing to the circular arc, there is necessarily also pivoting of the curved wind deflection member 5 upwards in addition to the longitudinal displacement, as is readily apparent with reference to FIG. 2. For supporting and displacing the curved wind deflection member 5 in the opposite slotted guides 10, each wind deflection arm 6 is provided with a complementary web-type sliding block 11 curved in the manner of a circular arc, which block projects into the respective slotted guide 10. The wind deflection arm 6 is directed past the slotted guide 10 respectively towards the center of the roof on the interior side such that the sliding block 11 integrally molded to the wind deflection arm 6—in relation to a roof center—projects into the slotted guide 10 from the inside to the outside. The slotted guide 10 is integrated in a functional component 7 which is positioned above the guiding arrangement 3. The functional component 7 provides a narrow web portion extending in the longitudinal direction of the roof, which web bears on an upper side of the guiding arrangement 3. In the direction of motion ahead, the functional component 7 is continued in a guiding projection 9 of the guiding arrangement 3. The guiding projection 9 together with the functional component 7 is a synthetic material component which is plugged on a corresponding guide rail portion of the guiding arrangement 3 from the front and is fixed in relation to the frame module 2. Above the guiding arrangement 3 the functional component 7 has a circular arc-shaped central web 15, with the upper side thereof extending in parallel to the circular arc-shaped slotted guide 10. The slotted guide 10 is integrated in the central web 15. In addition, the functional component 7 includes two lateral webs 12, flanking the central web 15 in parallel on the outer and inner sides, with the upper sides of the lateral webs extending in parallel to the upper side of the central web 15 at least over part of their length and, consequently, likewise curved in a circular arc shape.

In the vicinity of its bottom side, the wind deflection arm 6 has support surfaces 13 curved in a circular arc shape which take support on the upper side of at least one lateral web 12 flush with the adjacent area. In addition, a support cam 14 is integrally molded to the wind deflection arm 6, which cam takes support on the upper side of the central web 15. The upper sides of the at least one lateral web 12 and the central web 15 provide sliding surfaces for the support surfaces 13 of the wind deflection arm 6 so that, during displacement of the sliding block 11 within the slotted guide 10, the wind deflection arm 6 is supported on the functional component 7 via additional surfaces. The not illustrated, opposite wind deflection arm 6 has an identical design. The opposite functional component 7 also has an identical design. What is meant by "identical design" is respectively also a mirror-symmetrical embodiment, since also with the opposite wind deflection arm the web-type sliding block 11 is extended from the interior to the exterior. Owing to the additional support of the wind deflection arms 6 on the respective functional component 7, increased stability of the curved wind deflection member 5 and improved guidance of the curved wind deflection member 5 between its rest position and its operating position are ensured.

Each of the two wind deflection arms 6 is associated with a respective spring unit (not illustrated in more detail), which spring unit permanently applies force and torque to the respective wind deflection arm 6 in the direction towards the raised operating position. The helical springs are preferably disposed in the same manner as in DE 10 2013 203 979 A1. Accordingly, upon moving a corresponding roof cover from its closed position in the direction towards its open position, the curved wind deflection member 5 is forcedly raised to its upwardly deployed operating position by corresponding action of forces and momentums of the spring units. When closing the roof cover again, the roof cover exerts a corresponding strain on the curved wind deflection member 5 counter the spring units, whereby the curved wind deflection member 5 is necessarily displaced forwards and downwards in the direction back to its rest position.

The invention claimed is:

1. A wind protection device on a closable roof opening portion of a motor vehicle, having a curved wind deflection member on which a flexible wind protection structure is retained and which has at least one lateral wind deflection arm which can be displaced by a guiding mechanism in a vertical direction and in a longitudinal direction of the closable roof opening portion between a lower rest position and an upwardly deployed operating position, wherein the guiding mechanism includes a linear force guide having a curved guiding path along which the wind deflection arm can be displaced in the longitudinal and vertical directions relative to the closable roof opening portion, wherein at least one of the at least one lateral wind deflection arm is associated with at least one supporting surface which is supported on a stationary sliding surface extending in parallel to the guiding path.

2. The wind protection device according to claim 1, wherein the guiding path is designed as a circular arc-shaped curved slotted guide, and in that the guiding mechanism includes a sliding block curved in the manner of a circular arc, which block is rigidly connected to the wind deflection arm and mounted in the slotted guide to be slidingly movable.

3. The wind protection device according to claim 2, wherein the slotted guide is integrated in a functional component of a guiding arrangement for a movable roof cover, which functional component is stationary in relation to the closable roof opening portion in a ready-for-use installed condition.

4. The wind protection device according to claim 3, wherein the functional component is in a web-type shape oriented in the vertical direction, and the functional component has at least one upper end edge surface which is the sliding surface for the wind deflection arm.

5. The wind protection device according to claim 4, wherein the end edge surface is oriented coplanarly or in parallel offset to a plane where the slotted guide extends.

6. The wind protection device according to claim 3, wherein the functional component is embodied in one part or a plurality of parts.

7. The wind protection device according to claim 3, wherein the functional component has a central web, wherein the slotted guide is provided, and at least one lateral web flanking the central web, which lateral web is provided with the sliding surface for the wind deflection arm extending in parallel to the slotted guide.

8. A wind protection device for a motor vehicle comprising:
a closable roof opening portion of the motor vehicle; and
a curved wind deflection member retaining a flexible wind protection structure;
the curved wind deflection member having at least one lateral wind deflection arm displaceable by a guiding mechanism in a vertical direction and in a longitudinal direction of the closable roof opening portion between a lower rest position and an upwardly deployed operating position;
the guiding mechanism including a linear force guide having a curved guiding path along which the at least one lateral wind deflection arm can be displaced in the longitudinal and vertical directions relative to the closable roof opening portion; and
at least one of the at least one lateral wind deflection arm having at least one curved supporting surface supported on at least one stationary sliding surface extending in parallel to the curved guiding path.

9. The wind protection device according to claim 8, wherein:
the curved guiding path comprises a circular arc-shaped curved slotted guide;
the guiding mechanism includes a sliding block curved in a circular arc; and
the sliding block is rigidly connected to the at least one lateral wind deflection arm and is slidingly and movably mounted in the slotted guide.

10. The wind protection device according to claim 9, further including:
a functional component including a guiding arrangement for a movable roof cover, the functional component including the slotted guide, the functional component being stationary relative to the closable roof opening portion.

11. The wind protection device according to claim 10, wherein:
the functional component has a vertically orientated web-type shape and the at least one stationary sliding surface of the at least one lateral wind deflection arm on at least one upper end edge surface of the functional component.

12. The wind protection device according to claim 11, wherein the at least one upper end edge surface is oriented coplanarly or in parallel offset to a plane where the slotted guide extends.

13. The wind protection device according to claim 10, wherein:
the functional component is embodied in one part or a plurality of parts.

14. The wind protection device according to claim 10, wherein:
the functional component comprises a central web and at least one lateral web flanking the central web;
the central web includes the slotted guide; and
the at least one lateral web includes the at least one stationary sliding surface for the at least one lateral wind deflection arm extending in parallel to the curved guiding path.

15. A wind protection device for a motor vehicle comprising:
- a curved wind deflection member;
- a flexible wind protection structure retained by the curved wind deflection member;
- the curved wind deflection member having at least one lateral wind deflection arm displaceable by a guiding mechanism in a vertical direction and in a longitudinal direction between a lower rest position and an upwardly deployed operating position;
- the guiding mechanism including a linear force guide having a curved guiding path along which the at least one lateral wind deflection arm can be displaced in the longitudinal and vertical directions; and
- at least one stationary sliding surface extending parallel to the curved guiding path;
- wherein at least one of the at least one lateral wind deflection arm has at least one supporting surface supported on the at least one stationary sliding surface.

16. The wind protection device according to claim 15, wherein:
- the curved guiding path comprises a circular arc-shaped curved slotted guide;
- the guiding mechanism includes a sliding block curved in a circular arc; and
- the sliding block is rigidly connected to the at least one lateral wind deflection arm and is slidingly and movably mounted in the slotted guide.

17. The wind protection device according to claim 16, further including:
- a functional component including a guiding arrangement for a movable roof cover, the functional component including the slotted guide.

18. The wind protection device according to claim 17, wherein:
- the functional component has a vertically orientated web-type shape and the at least one stationary sliding surface for the at least one lateral wind deflection arm on at least one upper end edge surface of the functional component.

19. The wind protection device according to claim 18, wherein the at least one upper end edge surface is oriented coplanarly or in parallel offset to a plane where the slotted guide extends.

20. The wind protection device according to claim 17, wherein:
- the functional component comprises a central web and at least one lateral web flanking the central web;
- the central web includes the slotted guide;
- the at least one lateral web includes the at least one stationary sliding surface for the at least one lateral wind deflection arm extending in parallel to the curved guiding path.

* * * * *